G. S. WITHAM, Sr.
PAPER TESTER.
APPLICATION FILED MAY 17, 1918.
1,298,138.
Patented Mar. 25, 1919.
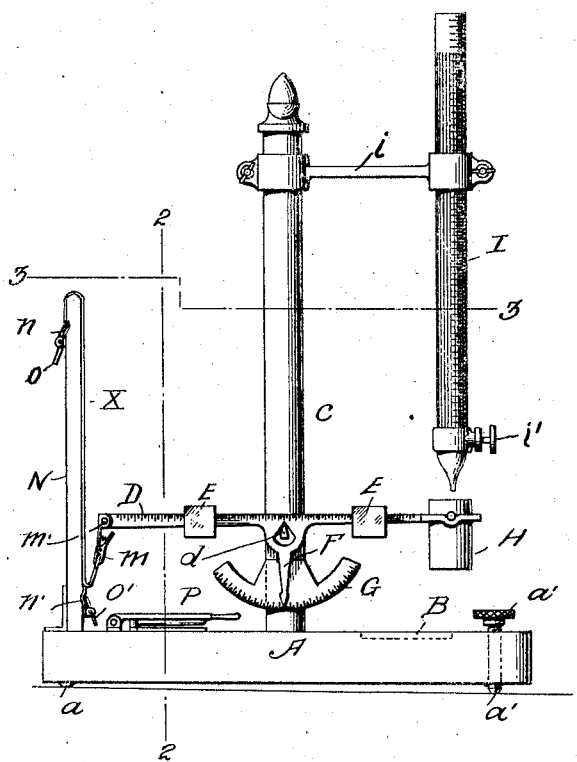
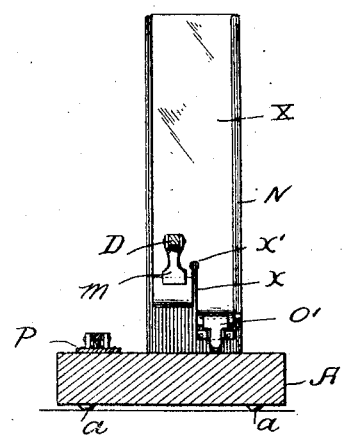
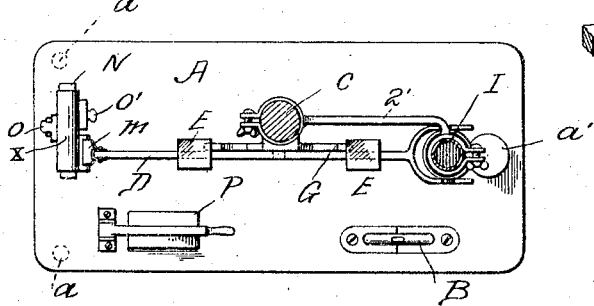
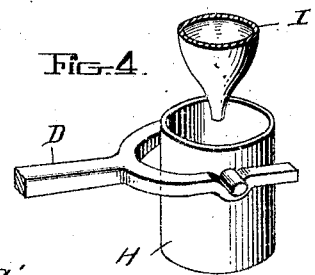
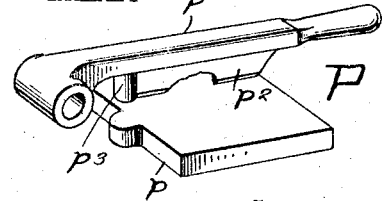
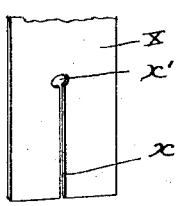
Witness
Ernest C. Crocker
Inventor
George S. Witham, Sr.
By His Attorneys
Baldwin Wight

UNITED STATES PATENT OFFICE.

GEORGE S. WITHAM, SR., OF HUDSON FALLS, NEW YORK, ASSIGNOR OF ONE-HALF TO GEORGE S. WITHAM, JR., OF HUDSON FALLS, NEW YORK.

PAPER-TESTER.

1,298,138.  Specification of Letters Patent.  Patented Mar. 25, 1919.

Application filed May 17, 1918. Serial No. 235,058.

*To all whom it may concern:*

Be it known that I, GEORGE S. WITHAM, Sr., a citizen of the United States, residing at Hudson Falls, in the county of Washington and State of New York, have invented certain new and useful Improvements in Paper-Testers, of which the following is a specification.

The object of this invention is to provide efficient means for testing the tearing strength or resistance of paper.

The tearing test is one of the most common methods of determining the service quality of paper and yet, heretofore, no reliable means have been found for performing and registering such tests with any degree of accuracy.

It is true that paper testers of various kinds have been used, but such testers are not primarily intended to indicate or register the tearing strength or resistance of paper, and they do not, in practice, give accurate information of the service strength or resistance of paper so far as its tearing strength or resistance is concerned. The only way in which such tearing strength or resistance is now determined is by hand, the sense of touch or feeling of the person making the test being relied upon, and this varies widely in different individuals and gives rise to much confusion and many disputes as to the quality of paper, judged by its tearing strength, and this is especially true when applied to certain weights and grades of paper used in the manufacture of paper bags.

Instruments for testing the tearing strength of paper should indicate the fibrous tear lengthwise of the grain. If a paper bag splits lengthwise it renders the bag useless. When a paper bag fails to render good service it tears, usually lengthwise of the grain and this determines the strength of the bag, and therefore an instrument which will forecast the service properties of paper, especially such as is used in the manufacture of paper bags, is of great utility.

According to my invention, I provide an instrument for testing sample sheets or strips of paper which is equipped with means for indicating or registering the tearing strength or resistance of paper in accordance with an accepted system for the paper being tested.

The apparatus which I preferably employ comprises a graduated scale beam provided with adjustable weights and carrying a clip or other suitable device for connecting the paper with the beam while the paper is being tested. Preferably the scale beam carries a cup arranged under a graduated tube containing water or other liquid and equipped with a valve to regulate the flow of the liquid from the tube to the cup. In this way the weight of the liquid added to the cup may be read on the tube and thus the weight required to tear the paper may be determined.

The scale beam is provided with devices to indicate when the beam is at zero or accurately balanced, and it is also associated with devices to indicate the extent to which the paper is torn during a test.

The paper to be tested is carried by a support suitably located with reference to the scale beam and provided with means for holding the paper properly stretched on the support. I preferably also employ a combined cutter and punch for cutting a hole and a slit in the paper in order that a suitable portion of the paper may be provided for connection with the testing device and in order also that when the tearing of the paper by the instrument commences a clean start may be made. Other features of my invention will be hereinafter explained.

In the accompanying drawings:—

Figure 1 shows a side elevation of a paper tester embodying my improvements.

Fig. 2 shows a section thereof on the line 2—2 of Fig. 1.

Fig. 3 shows a transverse section on the line 3—3 of Fig. 1.

Fig. 4 is a detail view in perspective, showing a portion of the scale beam, the cup which it carries and the graduated tube with which it is associated.

Fig. 5 is a perspective view of the combined knife and punch for forming a hole and slit in the paper.

Fig. 6 illustrates how the hole and slit are made in the paper.

The base A of the instrument is supported on short feet $a$ and an adjustable screw $a'$ by which latter device the base may be set at the proper level. A spirit level B may be employed to obtain greater accuracy.

A vertical post C on the base supports a scale beam D which is fulcrumed at $d$ and on each side of the fulcrum carries an adjustable weight E. The scale beam is properly graduated, as indicated.

A pointer F carried by the scale beam coöperates with a protractor G which is graduated in inches to indicate the extent of the tear made by the instrument in the paper when tested. One end of the beam D carries a cup H, arranged under a burette tube I, supported by a bracket $i$, adjustably connected to the post C. The burette tube is graduated, as indicated, to show the amount of liquid withdrawn from it, and it is provided with a valve $i'$, to regulate the flow. When the paper begins to tear the valve is closed, the flow of liquid to the cup is stopped and the reading is taken on the burette tube. If it be found that twenty cubic centimeters of water have been taken from the tube it is known that it took twenty grams to tear the paper, assuming that the weights E and E balance each other.

The opposite end of the scale beam carries a clip or device $m$ adapted to grasp the paper to be tested. This clip is swiveled or pivotally connected to the beam at $m'$ in order that it may adapt itself to the movement of the beam about its fulcrum.

A paper support N is mounted on the base near one end thereof close to the adjacent end of the scale beam so that the clip $m$ may be readily connected with the end of the paper to be tested. The support N is preferably a board having transverse grooves $n$, $n'$.

The paper X to be tested is held in place on the board by suitable devices such as clips $o$, $o'$ which press the paper into the grooves and prevent it from slipping.

Before the paper is placed on the support it is preferably cut in the manner shown in Fig. 6, $i. e.$, a slit $x$ is formed in it at one end which terminates in a hole $x'$. This is for the purpose of giving a start to the tear and affording a part to be grasped by the clip $m$ and also to afford a means of giving a proper start to the operation of tearing during the test.

For the purpose of cutting the paper in the manner specified, I preferably employ a cutter P, of the kind shown in Fig. 5. It comprises a base $p$, to which is hinged a lever $p'$, carrying a knife $p^2$ and a punch $p^3$. The cutter may be mounted on the base A in the manner shown in the drawings, and when a sheet or strip of paper is to be tested it is placed under the knife and punched and cut, in the manner indicated in Fig. 6.

The strip or sheet of paper is then placed on the support N being stretched over the top and held at its upper end by the clip $o$ which forces the paper into the upper groove $n$. The clip $o'$ is made to engage the lower end of the paper on one side of the slit $x$ and force it into the groove $n'$. In this way the paper is properly supported and firmly held in place. After the paper is thus arranged the clip $m$ on the beam D is made to grasp the lower end of the paper, as shown, and after this the test may proceed.

The weights E are first so adjusted as to hold the beam truly horizontal or until the pointer indicates zero on the protractor G, the clip $m$ being also properly adjusted for this purpose. If it is known that the paper being tested is strong enough to stand a little over one ounce, for instance, of pulling strain, one of the weights E is moved on the scale beam to exert one ounce on the paper, but the tearing of the paper will not then commence inasmuch as, before stated, the paper is known to be strong enough to stand something over one ounce of pulling strain. After the adjustment referred to has been made, liquid is allowed to drop from the burette tube into the cup H and when it is observed that the paper begins to tear the valve of the tube is closed and the reading is taken from the burette glass. If it be found that twenty cubic centimeters of liquid have been taken from the tube it is shown that it took one ounce beam weight and twenty grams to tear the paper.

As intimated above, the burette tube, which is of glass, is graduated in cubic centimeters, one cubic centimeter indicating one gram. The protractor G indicates in inches the length of tear given to the paper, and the graduations on the beam D indicate weight in ounces. It will be understood, however, that the precise system of graduations may be varied, but those suggested are deemed best.

As before stated, so far as I am aware, no instrument has heretofore been provided for accurately indicating or registering the tearing strength of paper of any kind and while the apparatus or mechanism shown in the drawings and hereinbefore described embodies the best way now known to me of carrying out my invention, I do not wish to be limited in my claims for novelty to the precise organization of instrumentalities either shown or described.

I claim as my invention:

1. A paper tester comprising means for supporting a strip of paper, means for fastening one side of one end of the strip to the support, a weighted lever provided with means on one side of its fulcrum for engaging the other side of said paper, means for adding weight to the opposite side of said lever, including means for indicating the force required to perform the tearing operation.

2. A paper tester, comprising a support for a strip of paper, means for securing the paper strip at its opposite ends to its support, a device movable lengthwise of the strip for tearing it, and means associated with such device for indicating the force required to perform the tearing operation.

3. A paper tester, comprising a support for a strip of paper, means for securing one end of the paper strip to its support, means for securing one side of the opposite end of the paper to said support, a clip adapted to engage the opposite side of the paper at said last mentioned end, a device connected with said clip for tearing the paper strip longitudinally of its length, and means associated with such device for indicating the force required to perform the tearing operation.

4. A paper tester, comprising a support for a strip of paper, means for securing one end of the strip to a support, means for securing one side of the opposite end of the paper to said support, a clip adapted to engage the opposite side of the paper at said last mentioned end, a scale beam, a paper clip carried by the scale beam which is movable lengthwise of the strip during the tearing operation, and means associated with the scale beam for indicating the force required to perform the tearing operation.

5. A paper tester, comprising means for supporting a strip of paper to be tested, means for holding the paper on one side against movement, a scale beam, means carried by the scale beam for connecting it with the strip of paper and which is movable lengthwise of said strip during the tearing operation, an adjustable weight carried by the scale beam, and means associated with the scale beam for adding weight thereto and which is graduated to indicate the force required to perform the tearing operation.

6. A paper tester, comprising a fulcrumed scale beam, means for connecting the scale beam with a strip of paper to be tested and which is movable lengthwise of the strip during the tearing operation, means associated with the scale beam for indicating the force required to tear the paper, a protractor graduated to indicate the extent of the tear made by the instrument, and a pointer carried by the scale beam and coöperating with said protractor.

7. A paper tester, comprising a vertically arranged support for a strip of paper to be tested, means for securing the upper end of the paper to the upper portion of the support, a device for holding the paper against movement on one side of its lower end, a scale beam provided with means for securing one end thereof to the free end of the lower portion of the paper strip, adjustable weights on both sides of the fulcrum of the scale beam, a cup carried by the beam, and a liquid-containing tube supplying liquid to the cup and which is graduated to indicate the force required to perform the tearing operation.

8. A paper tester, comprising a support for a strip of paper to be tested, means for clamping the paper on said support, a scale beam, a clip pivotally connected with the scale beam adapted to engage the paper to be tested and which is movable lengthwise of the strip during the tearing operation, and means associated with the scale beam for indicating the force required to perform the tearing operation.

9. A paper tester, comprising a base, a vertical support thereon for a strip of paper to be tested which has a slitted lower end, a clamp for the lower end of the paper on one side of the slit, a paper clip carried by the beam adapted to engage the lower end of the paper to be tested and which is movable lengthwise of the paper strip, a scale beam fulcrumed on the base, and means associated with the scale beam for indicating the force required to perform the tearing operation.

10. A paper tester, comprising a base, a vertical support thereon for a piece of paper to be tested which has a slitted lower end, a clamp for the lower end of the paper on one side of the slit, a graduated scale beam fulcrumed on the base, an adjustable weight thereon, and a paper clip carried by the beam and adapted to engage the lower end of the paper to be tested on one side of its slitted portion.

In testimony whereof, I have hereunto subscribed my name.

GEORGE S. WITHAM, Sr.

Witnesses:
BEECHER S. SHAW,
GEORGE G. DURANT, Jr.

Copies of this patent may be obtained for five cents each, by addressing the "Commissioner of Patents, Washington, D. C."